US008332179B2

(12) United States Patent
Nolle et al.

(10) Patent No.: US 8,332,179 B2
(45) Date of Patent: Dec. 11, 2012

(54) SENSOR DEVICE FOR A FLUID POWER APPARATUS

(75) Inventors: Gerhard Nolle, Plochingen (DE); Jurgen Arbter, Waiblingen (DE)

(73) Assignee: Festo AG & Co, Esslingen (DE)

( * ) Notice: Subject to any disclaimer, the term of this patent is extended or adjusted under 35 U.S.C. 154(b) by 561 days.

(21) Appl. No.: 12/042,009

(22) Filed: Mar. 4, 2008

(65) Prior Publication Data

US 2008/0243422 A1 Oct. 2, 2008

(30) Foreign Application Priority Data

Mar. 29, 2007 (DE) ......................... 10 2007 015 111

(51) Int. Cl.
*G01L 7/00* (2006.01)

(52) U.S. Cl. ........................... 702/138; 702/47; 702/104

(58) Field of Classification Search .................... 702/50, 702/104, 138
See application file for complete search history.

(56) References Cited

U.S. PATENT DOCUMENTS 5,056,046 A * 10/1991 Mutchler et al. ................ 702/98
6,125,868 A * 10/2000 Murphy et al. ................... 137/1
6,267,432 B1 7/2001 Stolle
6,294,997 B1 * 9/2001 Paratore et al. ............ 340/572.1
6,571,132 B1 * 5/2003 Davis et al. ....................... 700/2
2005/0087235 A1 4/2005 Skorpik et al.
2008/0126665 A1 * 5/2008 Burr et al. ..................... 710/316
2009/0195363 A1 * 8/2009 Downie et al. ............... 340/10.4

FOREIGN PATENT DOCUMENTS

DE 102005041510 A1 3/2007
WO WO2006048269 A1 5/2006

OTHER PUBLICATIONS

Prince et al., Aug. 15, 2005, The application of fieldbuses to valve automation, http://www.processingtalk.com/news/kco/kco100.html.*
Derwent World Patents Index. English abstracts of Foreign patent documents WO2006048269 A1 and DE102005041510 A1.
German Examination Report of German Application No. 10 2007 015 111.1.

* cited by examiner

*Primary Examiner* — Jonathan C Teixeira Moffat
*Assistant Examiner* — Mischita Henson
(74) *Attorney, Agent, or Firm* — Hoffmann & Baron, LLP

(57) ABSTRACT

A sensor device for a fluid power apparatus and in particular a pneumatic cylinder comprises at least one sensor for producing at least one sensor value on the basis of a property or a condition of the fluid power apparatus, and a sensor communication means for the transmission of the at least one sensor value. As regards the sensor device there is a provision such that it includes a reading means for reading apparatus identification data characterizing the fluid power apparatus and the sensor device is adapted for the transmission of the apparatus identification data by way of the sensor communication means.

20 Claims, 2 Drawing Sheets

SENSOR DEVICE FOR A FLUID POWER APPARATUS

CROSS-REFERENCE TO RELATED APPLICATION

This application claims priority based on German Application No. 10 2007 015 111.1 filed on Mar. 29, 2007, which is incorporated herein by reference.

BACKGROUND OF THE INVENTION

1. Field of the Invention

The invention relates to a sensor device for a fluid power apparatus and in particular a pneumatic cylinder with at least one sensor for producing at least one sensor value on the basis of a property or a condition of the fluid power apparatus, and a sensor communication means for the transmission of the at least one sensor value and to a fluid power apparatus fitted with such a sensor device.

2. Description of the Related Art

The fluid power apparatus can for example be a pneumatic cylinder, an electropneumatic hybrid drive or the like. The sensor is responsive to properties or operational states of the apparatus, as for example a position of the piston, pressures in chambers of the cylinder or the like. By way of the sensor communication means, as for instance a digital output interface, the sensor device transmits sensor values, as for example pressure values, position values or the like, of the fluid power apparatus, for example to a controller or regulator for the apparatus. The controller or regulator controls or regulates the apparatus on the basis of the sensor values. A position regulation means finds, on the basis of the sensor values, which constitute actual values, e. g. the desired target position of the piston.

In order to perform such regulation tasks the regulation means must be parameterized in an elaborate procedure. For this purpose for example sensor data, as for example measurement ranges of the sensor device, must be set in the regulation means by parameters. Furthermore elaborate parameterizing must be performed on the basis of physical properties of the fluid power apparatus to be controlled or regulated, as for example travel displacements, piston diameters or the like.

SUMMARY OF THE INVENTION

One object of the invention is to provide a simplified operational concept for a sensor device.

In order to achieve these and/or other objects appearing from the present specification, claims and drawings, in the present invention the sensor device includes a reading means for reading apparatus identification data characterizing the fluid power apparatus and the sensor device is adapted for the transmission of the apparatus identification data by way of the sensor communication means. Moreover a fluid power apparatus fitted with such a sensor device is suitable for achieving the object of the invention.

One basic principle of the invention is that the sensor device provides an additional functionality: addition to sensor values it also transmits apparatus identification data of the apparatus, whose operational states, properties or the like are sensed by it. The sensor communication means, which is in any case present, is utilized in addition for such communication tasks. For the communication of apparatus specific identification data no separate interface and no transmission means on the fluid power apparatus is needed. The sensor may for example include a position sensor, a pressure sensor a temperature sensor or a force sensor.

The apparatus identification data may for example comprise the type of the apparatus, a serial number of the apparatus, physical quantities as for example length, effective surface of an actuator member or a piston, pressure values and more particularly maximum pressures, rated operating pressures, force output values force output values as related to the pressures set, a working stroke or the like. Furthermore kinematic data of the fluid power apparatus, f. i. speed values such as a maximum speed or a rated operating speed, a braking distance or the like may represent apparatus identification data.

The apparatus identification data may for example be saved to a sensor memory. For instance the sensor device may have a micro-controller, which comprises a sensor memory. It is furthermore possible to use a sensor memory, such as a flash memory or an E(E)Prom for the storage of the apparatus identification data.

It is an advantage furthermore for sensor identification data, which characterize the sensor device, to be saved in the sensor memory. The sensor device is responsible for the output of such sensor identification data, also via the sensor communication means. The sensor identification data may for example comprise the sensor type, the serial number, measurement ranges of the sensor, resolution, zero point or the like.

The sensor memory is able to be programmed with the respective identification data (sensor identification data) and/or apparatus identification data. For instance it may be a question of the sensor memory'S being a flash memory.

In the system of the invention the apparatus identification data are more or less saved on board the sensor device. On the fluid power apparatus itself no further means are necessary, as for example a storage chip for saving the apparatus identification data. However this possibility does exist.

The reading means of the sensor device for example comprises a receiving means for receiving of apparatus identification data transmitted by the fluid power apparatus. The reading means may be constituted by the receiving means or e comprised in the receiving means. Furthermore the reading means may be a separate means, as for example an optical reader or a wireless receiver connected to the receiving means. The apparatus identification data are stored in accordance with this part of the invention at least partly in a apparatus memory of the fluid power apparatus and are passed on to the sensor device, which communicates the apparatus identification data by way of the sensor interface.

It is admittedly possible for the receiving means to have a wired connection with the apparatus memory of the fluid power apparatus, as for example by way of electrical contacts. However it is advantageous to have a wireless connection, in the case of which the receiving means is joined in a wireless manner with the fluid power apparatus. Wireless for example means transmission by light, radio or the like. A so-called radio frequency identification (RFID) chip may be arranged on the fluid power apparatus.

Furthermore a hybrid design is possible, i. e. a part of the apparatus identification data are saved on board the sensor device in the sensor memory, whereas other data, as for example the type characteristic of the fluid power apparatus are saved in the apparatus memory. The fluid power apparatus then transmits the type characteristics to the sensor device, which then passes on such type characteristics in addition to other apparatus identification data, such as physical properties of the apparatus, by way of the sensor communication means. In this respect it is also possible for the sensor device to retrieve, on the basis of first apparatus identification data communicated by the fluid power apparatus, second apparatus identification data in its sensor memory. Accordingly the fluid power apparatus may communicate, for example, its type characteristic to the sensor device or the sensor device may read such type characteristic from the fluid power apparatus and on the basis of the type characteristic may find further apparatus identification data in the sensor memory, as for example physical properties assigned to the type characteristic, of the fluid power apparatus.

The sensor communication means preferably possesses at least one bus interface, as for example a field bus interface. It is an advantage for there also to be a second bus interface in the sensor device so that the sensor device may be concatenated with further components of the bus. Thus for example further sensor devices can be concatenated, f. i. sensor devices in accordance with the invention for the transmission of apparatus identification data or also prior art sensor devices not suitable for the transmission of apparatus identification data.

It is an advantage for the sensor device to transmit the apparatus identification data automatically, as for example as part a signing in procedure during coupling up with an automated system. The sensor device can however communicate the apparatus identification data as a response to interrogation, for example of a master control or regulation means.

Preferably the sensor memory is a non-volatile memory. Accordingly the apparatus identification data will be kept even upon a failure of the power supply.

It is an advantage however for the sensor device to have an electrical power storage means, and more particularly a long term storage means. Accordingly it is possible for the control means to be operated in a self-sustaining manner independent of an external power supply. The battery, as for example a battery with a long lifetime, is preferably able to be replaced. Owing to having the electrical energy storage means on board the sensor device simple installation is possible. Furthermore it is quite possible for the sensor device to be encapsulated so that it comes within a high electrical safety class and/or has a high degree of electromagnetic compatibility. Operation with the energy storage means is more particularly convenient in the case of a wireless sensor communication means. Accordingly no line connections are necessary in order to couple the sensor device with an automated system, a regulation system or the like. The electrical energy storage means may serve for saving the data held in the sensor memory, inter alia the apparatus identification data. In addition to the electrical energy storage means or as an alternative thereto it is possible to provide a local energy producing unit, as for example solar cells, an electrical generator operated with fluid, or the like, in the sensor device. The local energy producing unit will for example produce electric current, which is stored in a buffer storage means, as for example capacitor, of the sensor device.

For long term operation of the sensor device it is also advantageous for it also to have an energy economizing function. For instance the sensor device may after a predetermined time of inactivity switch over to an energy economy quiescent mode. On receiving an interrogating message, on a change in the condition of the fluid power apparatus to be sensed or the like, the sensor device will be reactivated and will communicate, for example sensor values, apparatus identification data or the like.

The sensor device may be an integral part of the fluid power apparatus, and for example can be integrated in its housing. For instance the sensor device may be mounted in an end plate of a pneumatic cylinder.

However a modular concept is also advantageous, that is to say the sensor device is a sensor module able to be arranged on the fluid power apparatus and more particularly detachably secured to it. The sensor device may for example be secured on an end plate or in a groove in the cylinder housing. Furthermore attachment by screwing, clipping or adhesive bonding is possible. The modular concept does however mean the advantage that the sensor device may be readily detached in the case of a failure or if it is required somewhere else.

The sensor device preferably has electrical contacts, which on arrangement on the fluid power apparatus provide a connection with the memory of the fluid power apparatus. Here, as explained above, the apparatus identification data are stored at least in part. It will be clear that wireless transmission between the apparatus memory and the sensor device arranged on the apparatus is possible.

Furthermore it is possible for the sensor module to be designed as a sort of intermediate module which while being able to be operated detached from the fluid power apparatus, nevertheless is responsive to its conditions and/or properties. More particularly in the case of this concept it is an advantage if the sensor device communicates in a wireless manner with a memory of the fluid power apparatus in order to read out the apparatus identification data from it, if the data are not alternatively held on board the sensor device in its sensor memory. The intermediate module may for example be a position measuring system, which is arranged at a certain distance from the fluid power apparatus. Furthermore it is possible for the intermediate module to be in the form of a pressure sensor which is arranged on a fluid line connected with the fluid power apparatus.

The fluid power apparatus may be designed in a variety of different forms. Thus it can for example be a power cylinder, as for example a piston rod-less power cylinder or one with a piston rod, a pneumatic servicing device, a vacuum means, as for example a suction means, a pneumatic valve or the like. The fluid power apparatus may however also be a so-called hybrid drive, that is to say a drive, which has a fluid power as for example a pneumatic, drive component or a functionally coupled electrical drive component.

In connection with the modular concept, in which the sensor device constitutes a separate unit, it is to be stressed that this configuration is also regarded as an invention in its own right in conjunction with exclusively electrical drives, that is to say as a patentable subcombination. The sensor device transmits apparatus identification data of the electrical drive by way of its sensor communication means.

It is an advantage for the sensor device to possess diagnostic means for diagnostic data concerning the fluid power apparatus, as for example wear data, data as regards the number of duty cycles, as regards pressure fluctuations indicative of an error or the like. The sensor device transmits the diagnostic data preferably by way of its sensor communication means. Furthermore a display provided on the sensor device, such as an LCD display, LED's or the like is an advantage.

Further advantageous developments and convenient forms of the invention will be understood from the following detailed descriptive disclosure of embodiments thereof in conjunction with the accompanying drawings.

DETAILED DESCRIPTION OF THE PREFERRED EMBODIMENTS

Figure 1:
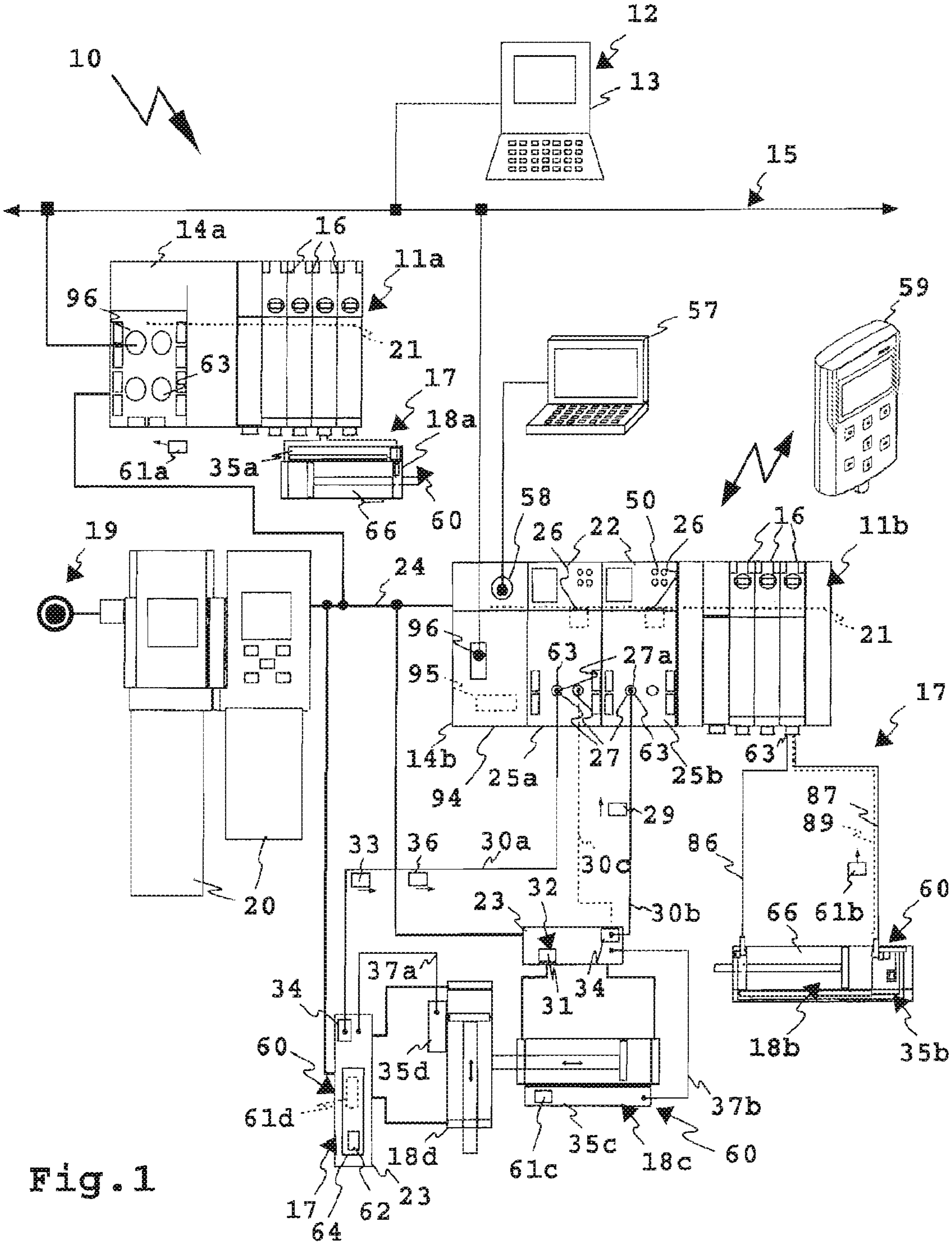
FIG. 1 diagrammatically shows an automated system having two valve clusters and one central routing means.
Figure 2:
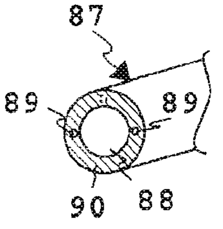
FIG. 2 shows a fluid line with integrated electrical conductors for the connection of an actuator with a valve cluster in accordance with FIG. 1.
Figure 3:
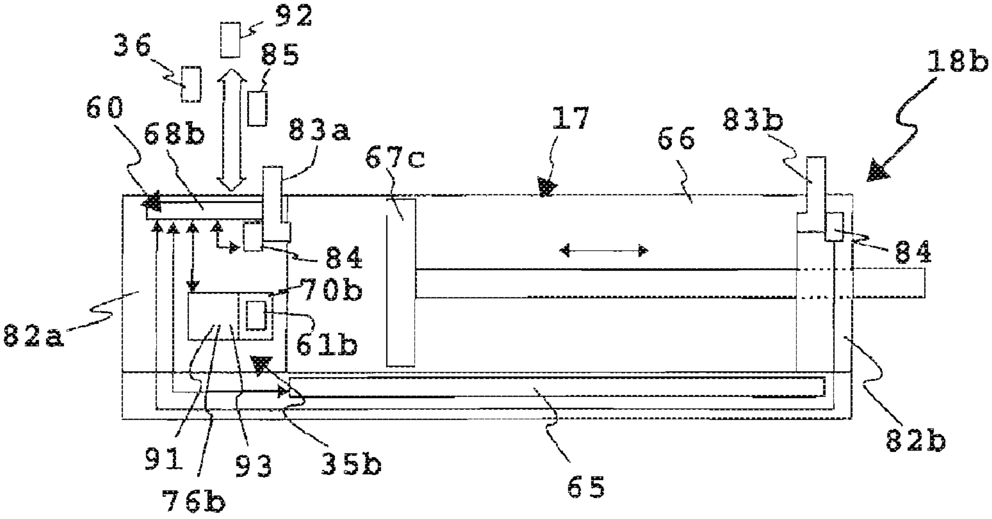
FIG. 3 shows a diagrammatic side elevation of a fluid power actuator with a sensor arrangement, which transmits apparatus identification data characterizing the actuator by way of a sensor communication means.
Figure 4:
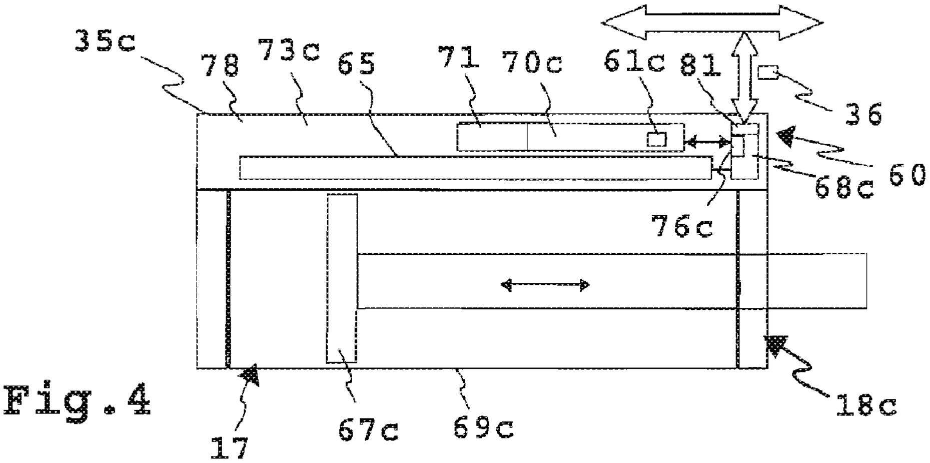
FIG. 4 shows an actuator with a sensor device constituting a separate unit and installed on the actuator, such sensor device also transmitting apparatus identification data of the actuator by way of a sensor interface.
Figure 5:
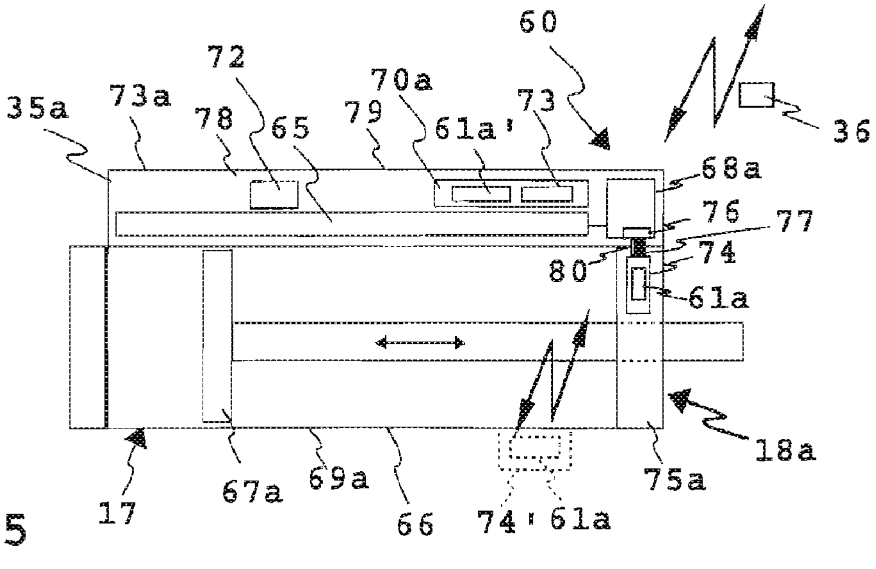
FIG. 5 shows an actuator with a memory, in which apparatus identification data characterizing the actuator are stored, such data being transmitted by a sensor device constituting a separate unit and being installed on the actuator, via a sensor communication interface thereof.

The working embodiments of the invention include partially similar or functionally equivalent components which are not described twice over and are provided with the same reference numerals.

In the case of an automated system 10 valve clusters 11*a* and 11*b* are controlled by a central master control means 12, as for example a routing computer 13. The valve clusters 11*a* and 11*b* are connected with valve cluster communication means 14*a* and 14*b* for external communication on a system bus 15, for example a field bus, by way of external interfaces 96, for example bus interfaces. The control means 12 control the valve clusters 11*a* and 11*b* via the system bus 1, which is connected in a wired or a wireless manner.

The valve clusters 11*a* and 11*b* comprise valve modules 16, which are placed in a row with the communication means 14*a* and 14*b*. The valve modules 16 serve for fluid control of the fluid power apparatus 17, for example pneumatic actuators 18*a* and 18*b*. The actuators 18*a* and 18*b* are pneumatic drive cylinders 66, which as illustrated may have piston rods although designs without piston rods or with an additional electrical drive part are possible. The regulation modules 25*a* and 25*b* are also designed for the regulation of electrical or combined fluid power and electrical drives. Thus for example instead of the pneumatic actuator 18*d* an electrical drive could be provided.

The valve clusters 11*a* and 11*b* are run on compressed air, for example from a compressed air source 19. The compressed air source 19 supplies, for example, servicing apparatus 20, as f. i. filters and oilers, which prepare compressed air for the valve clusters 11*a* and 11*b*. The servicing apparatus 20 is in the present case separate from the valve clusters 11*a* and 11*b*, although it could for example constitute components of the valve cluster 11*b*.

From the central control means 12 the valve modules 16 receive control instructions for the pneumatic control of the actuators 18*a* and 18*b* via the system bus 15. The communication means 14*a* and 14*b* transmit the control instructions so received by way of internal communication buses 21 to the valve modules 16. The communication buses 21 serve for internal communication of the valve clusters 11*a* and 11*b*.

While the valve cluster 11*a* is controlled exclusively externally by way of the system bus 15, the valve cluster 11*b* has a local control competence in the form of control means 22. The control means 22 are designed in the form of control modules, which are placed in circuit between the valve modules 16 and the communication means 14*b* in the form of a communication module.

Optionally it is possible for the valve cluster 11*b* to have a local control means 94 for its control, f. i. of the valve modules 16, as for example a separate control module. The communication means 14*b* as well can be designed in the form of such a local control means 94 for the valve cluster 11*b*. For this purpose the communication means 14*b* will then for example have a processor 95, which transmits control instructions by way of communication bus 21, for example to the valve modules 16.

The control means 22 control valve means 23, which for their part control actuators 18*c* and 18*d*. The actuators 18*c* and 18*d* constitute, for example, servo drives. Admittedly the actuators 18*c* and 18*d* could constitute two drives independent of each other. However the actuators 18*c* and 18*d* are mechanically coupled with each other. In the drawing this is diagrammatically indicated since the actuator 18*d* is arranged on a force output means of the actuator 18*c* for example on its piston rod. A mechanical coupling may however be realized indirectly, for example if the actuators 18*c* and 18*d* constitute the drives of a gantry or carriage traveling in the X and the Y directions.

The valve means 23 are valves separate from the valve cluster 11*b* and connected with a compressed air network 24 supplied by the compressed air source 19 with compressed air. The valve means 23 control the compressed air supply to the actuators 18*c* and 18d, which are for example pneumatic drive cylinders. The valve means 23 and the actuators 18*c* and 18*d* also consitute fluid power apparatus 17.

The control means 22 regulate the actuators 18*c* and 18*d* by control of the valve means 23 for regulation. The control means 22 are for example regulation modules 25*a* and 25*b*. The regulation modules 25*a* and 25*b* fit in well with the modular concept of the valve cluster 11*b*. They are able to be placed in line with the valve modules 16 and the communication means 14*b*. The regulation modules 25*a* and 25*b* are coupled at internal bus interfaces 26 with the internal communication bus 11*b*. The regulation modules 25*a* and 25*b* may receive messages by way of the communication bus 21, as for example control instructions from the control means 12 and may transmit messages, as for example indications, which the communication means 14*b* passes on to the control means.

For their regulation tasks the regulation modules 25*a* and 25*b* have separate regulation communication interfaces 27 for the issue of target values 28 and the reception of actual values 29. The communication interfaces 27 are real time interfaces. The communication interfaces 27 comprise digital bus interfaces 27*a*. The valve means 23 are connected by way of bus lines 30*a* and 30*b* with the communication interfaces 27 so that each fluid power unit to be regulated comprising a respective valve means 23 and one of the actuators 18*c* and 18*d* has a separate regulator bus line 30*a* or 30*b* available for it. Accordingly rapid communication is possible between the units to be regulated and the assigned regulation module 25*a* and 25*b*. Between each regulation module 25*a* and 25*b* and its arrangement to be regulated 23 and 18*c* or 23 and 18*d* there is a separate physical connection. The actual values 29 are then transmitted by these connections.

As an alternative the regulation module 25*a* could be a regulator for two actuators and regulate both arrangements 23, 18*c* and 23 and 18*d* via the bus line 30*a* and an optional bus line 30*c* leading to the regulation module 25*a* in lieu of the bus line 30*b*.

The actual values 29 contain pressure sensor values 33 for example, which are generated by pressure sensors 31 of a sensor arrangement 32 of the valve means 23. The pressure sensors 31 are for example arranged on ports of pressure lines, by which the actuators 18*c* and 18*d* are joined with the valve means 23. To this extent the valve means 23 constitute sensor means. The valve means 23 transmit the pressure sensor values 33 by means of a bus coupler 34 which to this extent constitutes a sensor communication interface, on the respective bus line 30*a* or 30*b* to the regulation module 25*a* or 25*b*.

Sensor means 35*c* and 35*d* arranged on the actuators 18*c* and 18*d* produce further sensor values as actual values 29, for example pressure values, temperature values and/or position values 36.

The sensor means 35*c* and 35*d* are coupled serially with the valve means 23 via bus lines 37*a* and 37*b*. For this purpose it is however also possible for the connection contacts for the valve means 23 to have separate bus couplers. It is however possible for the bus lines 37*a* and 37*b* at the valve means 23 to be looped through to the corresponding connection contacts of the bus couplers 34. In any case the connection of the sensor devices 35*c* and 35*d* and of the valve means 23 is simplified because these means are coupled with each other in series because only one connection line leads to the regulation or communication interfaces 27.

The adjustment of parameters, in particular regulation parameters and/or a selection of the type of regulation (position regulation, pressure regulation, position regulation with slave pressure regulation) and/or a diagnosis of the modules of the valve cluster 11*b*, f. i. of the regulation modules 25*a* and 25*b*, may be undertaken at some central position using a user device 57, as for example a notebook. The user device 57 is able to be connected with a user device interface 58 of the communication means 14*b* and is thus able to be connected with the internal communication bus 21. Then parameters may be loaded from the user device 57 to the valve cluster 11*b*, for example the regulation modules 25*a* and 25*b* or any other modules. Furthermore a diagnosis is possible using the user device 57. Thus for example the regulation modules 25*a* and 25*b* can transmit failure messages, indications as regards a number of duty cycles already performed or other diagnostic data to the user device 57.

It will be clear that wireless operation or diagnosis is also possible, for example using a user device 59, which communicates with the communication means 14*b* in a wireless fashion.

The putting into operation of the automated system 10 and diagnosis and/or parameterizing of the regulation modules 25*a* and 25*b* is simplified by an auto-identification concept. The fluid power apparatus 17 or means assigned to it, as for example sensor means 35*a*. 35*b* and 35*c* assigned to the actuators 18*a* through 18*c*, comprise or constitute ident data transmission means 60, which transmit apparatus identification data 61*a*, 61*b*, 61*c*, 61*d* and 62 to receiving means 63 for the identification data 61*a* through 61*c* and 62 of the valve clusters 11*a* and 11*b*. The identification data 61*a* through 61*d* characterize the pneumatic actuators 18*a*, 18*b*, 18*c* and 18*d*. The identification data 62 characterize the valve means 23.

The apparatus identification data 62 of the valve means 23 are saved in an optionally present memory 64. In the case of the valve means 23 assigned to the actuator 18*d* in addition the apparatus identification data 61*d* can be saved as well, which characterize the actuator 18*d*. The actuator 18*d* has f. i. no memory of its own for saving its identification data and furthermore no interface to transmit such data to the valve cluster 11*b*.

The valve means 23 responsible for fluid control of the actuator 18*c* communicates the apparatus identification data 16*c* thereof, which it receives by way of the line 37*b*, via the bus line 30*b* on to the regulation communication interface 27.

The regulator communication interfaces 27 constitute or include receiving means 63 for the apparatus identification data 62 and 61*c* and also apparatus identification data 61*d* of the actuator 18*d*. On the basis of such apparatus identification data, which for example comprise the working strokes of the actuators 18*c* and 18*d*, the regulator modules 25*a* and 25*b* regulate the actuators 18*c* and 18*d*. In this respect it is possible for the regulator modules 25*a* and 25*b* to directly evaluate the apparatus identification data 61*c*, 61*d* and 62 for the generation of regulation parameters. Accordingly for example maximum pressures may serve for example for the limitation of pressure of the compressed air by pressure regulation. Furthermore it is possible, using the internal communication infrastructure, namely the internal communication bus 21 and the communication 14*b* means 14*b*, for the regulation modules 25*a* and 25*b* to transmit the respective apparatus identification data 61*b*, 61*d* and 62 to the user device 57, which generates the regulation parameters therefrom and transmits same to the regulation modules 25*a* and 25*b* using the said communication path.

The sensor means 35*a* transmits the apparatus identification data 61*a* in a wireless fashion to a receiving means 63 comprised in the valve cluster communication means 14*a*.

The actuator 18*b* is connected by a conventional pressure line 86 and a fluid connection line 87, which has a fluid duct 88 and data lines 89, with the valve cluster 11*b*. The data lines 89 are for example arranged in a casing 90 encircling the fluid duct 88. On plugging in the fluid connecting line 87 contacts (not illustrated) of the valve cluster 11*b* and of the sensor means 35*b* are connected with the data lines 89 so that simultaneously a fluid connection and a data connection are produced between the valve cluster 11*b* and the sensor device 35*b* and also the actuator 18*b*.

The sensor device 35*b* transmits the apparatus identification data 61*b* in a wired manner, f. i. by way of the data lines 89, to a receiving means 63, which for example is comprised in the valve module 16 driving the actuator 18*b*.

For saving and transmitting the apparatus identification data 61*a* through 61*d* and 62 different transmission concepts and memory concepts are possible. In the case of the automated system 10 it is preferred for sensor means to transmit the apparatus identification data 61*a*, 61*b*, 61*c*, 61*d* and 62 to the receiving means 63.

The valve means 23 comprises the pressure sensors 31 and to this extent constitutes a sensor device. Its bus coupler 34 to this extent constitutes a sensor communication means and the memory 64 with the apparatus identification data 62 and/or 61*d* constitutes a sensor memory.

The apparatus identification data 61*c* are not transmitted by the actuator 18*c* itself but by the sensor device 35*c* assigned to it. The sensor device 35*c* is arranged on the housing of the actuator 18*c*, for example in the longitudinal direction on the side and comprises a position sensor 65 which transmits position values 36 of an actuator member 67*c* of the actuator 18*c* by way of sensor communication interface 68*c*. The sensor communication interface 68*c* comprises a bus interface 81, for example a bus coupler, for a bus connection by way of the valve means 23 to the regulation communication interface 27.

The apparatus identification data 61*c*, which characterize the actuator 18*c* and for instance comprise the diameter of the actuator member 67*c*, the travel displacement of the actuator member 67*c* in a housing 69*c* of the actuator 18*c* or the like, are saved in a sensor memory 70*c*. The memory 70*c* is preferably programmable, for example by way of a programming interface 71 able to be connected with the user device 57. The sensor communication means 68*c* comprises electrical read contact as a reading means 76*c* for reading the sensor memory 70*c*.

The actuator 18*c* need not have any intelligence of its own for saving the apparatus identification data 61*c*.

The sensor means 35*c* may be supplied with electrical power for example by way of its sensor communication interface 68*c*, i. e. a bus coupler.

The sensor means 35*a* on the contrary, which also comprises a position sensor 65, has an electrical long term energy storage means 72, for example a lithium battery, for long term service independent of an external power supply. Furthermore for data transmission, as for example for the transmission of position values produced by a position sensor 65, no line connections are necessary either. The sensor device 35*a* has a wireless communication means 68*a*, which for example with the Wireless Fidelity (WiFi) standard.

In a sensor memory 70*a* of the sensor device 35*a* sensor identification data 73 are held, as for example the resolution of the position sensor 65, an initial position and an end position of the measurement range of the position sensor 65. Apparatus identification data 61*a* of the fluid power apparatus 17, as for example the diameter of the actuator member 67*a*, the maximum force available at a force output of the actuator 67*a* (f. i. at the piston rod) or the like are saved in an apparatus memory 74 of the fluid power apparatus. The apparatus memory 74 is mounted f. i. in a cover 75*a* of the housing 69*a* and includes a rewritable memory, f. i. an EEPROM. The apparatus memory 74 is programmed during manufacture of the fluid power apparatus 17 so that its apparatus identification data 61*a* are available and for example may be read out by a reading apparatus, as for example the user device 59.

It is an advantage to use a sensor communication interface for the transmission of the apparatus identification data stored in the fluid power apparatus, for example the actuator 18*a*. A reading means 76*a*, for example a data interface with electrical contacts of the sensor communication means 68*a*, reads the apparatus memory 74 via electrical connections 77.

The electrical connections 77 are automatically made during arrangement or assembly of the sensor means 35*a* designed in the form of a sensor module 78. A housing 79 of the sensor device 35*a* extends as far as the housing cover 75*a* so that contacts 80 of the sensor device 35*a* and of the actuator 18*a* touch and produce the electrical connections 77.

Alternatively a wireless concept is possible, in which the apparatus identification data 61 are for example saved in an apparatus memory 75' able to be read in a wireless manner, for example in a radio frequency identification (RFID) module. The reading means 76 is in this case a wireless reading interface, for example an RFID reading device. A transmission means of the apparatus memory 74' gets the transmission power, necessary for the transmission of the apparatus identification data) 61*a*, through the sensor device 35*a*, for example by way of an electrical connection (not illustrated) or as transmission energy transmitted by the transmission of an interrogation message on the part of the reading means 76.

The apparatus identification data 61*a* read from the apparatus memories 74 or 74' may also be first apparatus identification data, on the basis of which the sensor device 35*a* finds second apparatus identification data 61*a'* in its sensor memory 60*a*. The identification data 61*a'* are for example data, which complement the identification data 61*a*. Thus for example the apparatus identification data 61*a* may include the type characteristic of the actuator 18*a*, on the basis of which the sensor device 35*a* finds further characteristics of the actuator 18*a*, as for example its mechanical properties. Furthermore in the case of every sensor device in accordance with the invention, as for example in the case of the sensor device 35*a*, it is possible for the sensor device to convert or complement the sensor values on the basis of the apparatus identification data. Thus for example the sensor device 35*a* may provide the position values 36 with particulars in metric units, when it has found the specific travel displacement of the actuator member 67*a* on the basis of the apparatus identification data 61*a*. The sensor device 35*b* can specifically find a force output of the actuator 82*a* on the basis of the pressure sensor values 85 and provide an output thereof in f. i. newtons as force values.

While the sensor devices 35*a* and 35*c* constitute sensor modules 78 able to be detachably arranged on the actuators 18*a* and 18*c* and therefore in case of need may be replaced by other different types of sensor devices preferably in accordance with the invention, which for example comprise pressure sensors or the like, one sensor device 35*b* is an integral part of the actuator 18*b*.

The sensor device 35*b* has a position sensor 65 and also pressure sensors 84, which for example are arranged at gcompressed air ports 83*a* and 83*b*. A sensor communication means 68*b* transmits position values 36 and pressure sensor values 85 of the pressure sensor 84 in a wired manner. In principle separate data lines could be provided for this. The sensor communication means 68*b* is however connected with the data lines 89 of the fluid connection line 87.

By way of data lines 89 the sensor device 35*b* transmits the position sensor values 36 and the pressure sensor values 85 and furthermore, for example on signing up with the valve cluster 11*b* or on interrogation from the valve cluster 11*b*, the apparatus identification data 61*b* characterizing the actuator 18*b*. The apparatus identification data 61*b* are saved in a sensor memory 70*b* of the sensor device 35*b*.

The sensor device 35*b* furthermore has a processor 91, which for example counts the duty cycles of the actuator 18*b* and/or detects trouble conditions on the basis of the pressure sensor values 84, or the like. The processor constitutes a component of a diagnostic facility 93 and transmits such information as diagnostic data 92 by way of sensor communication means 68*b*.

What is claimed is:

1. A sensor device for a fluid power apparatus, the sensor device comprising:

a housing separate from the fluid power apparatus;

at least one sensor for producing at least one sensor value on the basis of a property or a condition of the fluid power apparatus, the at least one sensor being disposed in the housing; and a sensor communication means for the transmission of the at least one sensor value, the sensor communication means being disposed in the housing, wherein the sensor device includes a reading means configured to obtain apparatus identification data representing at least one mechanical property of the fluid power apparatus that is not sensed in the fluid power apparatus by the at least one sensor, the sensor device being adapted for transmission of the apparatus identification data by using the sensor communication means, the sensor device being configured to convert or complement the at least one sensor value based on the apparatus identification data, the reading means being connected with a receiving means for the reception of apparatus identification data transmitted by the fluid power apparatus or reading apparatus identification data from an apparatus memory of the fluid power apparatus, said device being adapted for locating second apparatus identification data in the sensor memory on the basis of first apparatus identification data transmitted by the fluid power apparatus.

2. The sensor device as set forth in claim 1, wherein the apparatus identification data includes at least one physical property of the fluid power apparatus.

3. The sensor device as set forth in claim 1, comprising a sensor memory in which the apparatus identification data are stored.

4. The sensor device as set forth in claim 3, wherein the sensor comprises memory sensor identification data characterizing the sensor device stored therein and the sensor device is responsible for output of the sensor identification data by way of the sensor communication means.

5. The sensor device as set forth in claim 3, wherein the sensor memory is able to be programmed by a user with the apparatus identification data.

6. The sensor device as set forth in claim 3, wherein the sensor memory is a non-volatile memory.

7. The sensor device as set forth in claim 1, wherein the reading means is connected with a receiving means for the reception of apparatus identification data transmitted by the fluid power apparatus or reads apparatus identification data from an apparatus memory of the fluid power apparatus.

8. The sensor device as set forth in claim 7, wherein the receiving means is designed for wireless communication with the fluid power apparatus.

9. The sensor device as set forth in claim 7, wherein said device is adapted for locating second apparatus identification data in the sensor memory on the basis of first apparatus identification data transmitted by the fluid power apparatus.

10. The sensor device as set forth in claim 1, wherein the sensor communication means include at least one bus interface and in particular a field bus interface.

11. The sensor device as set forth in claim 1, wherein the said device is adapted for automatic transmission of apparatus identification data as part of a signing up procedure on coupling with an automated system.

12. The sensor device as set forth in claim 1, wherein the said device includes an electrical energy storage means and in particular a long term storage means.

13. The sensor device as set forth in claim 1, wherein said sensor device exhibits an energy economy function, in which it switches over to an energy saving quiescent mode after a predetermined time.

14. The sensor device as set forth in claim 1, wherein said sensor device constitutes an integral component of the fluid power apparatus.

15. The sensor device as set forth in claim 1, wherein said sensor device is in the form of an intermediate module able to be operated remote from the fluid power apparatus.

16. The sensor device as set forth in claim 1, wherein said sensor device constitutes a sensor module able to be arranged on the fluid power apparatus and detachably secured in place thereon.

17. The sensor device as set forth in claim 16, comprising electrical contacts for providing a connection with a memory of the fluid power apparatus when the sensor device is arranged on the fluid power apparatus.

18. The sensor device as set forth in claim 1, wherein the fluid power apparatus includes a valve or a power cylinder or a servicing device or a vacuum means.

19. The sensor device as set forth in claim 1, comprising diagnostic means for retrieving diagnostic data as regards the fluid power apparatus.

20. The sensor device as set forth in claim 19, wherein said sensor device is adapted for the output of the diagnostic data using a display arranged on the sensor device.

* * * * *

UNITED STATES PATENT AND TRADEMARK OFFICE

CERTIFICATE OF CORRECTION

PATENT NO. : 8,332,179 B2
APPLICATION NO. : 12/042009
DATED : December 11, 2012
INVENTOR(S) : Nolle et al.

It is certified that error appears in the above-identified patent and that said Letters Patent is hereby corrected as shown below:

In the Specifications:

Column 2 line 1:

Now reads: "pressure sensor a temperature sensor"

Should read: -- pressure sensor, a temperature sensor --

Column 2, line 8:

Now reads: "force output values force output values"

Should read: -- force output values, force output values --

Column 2, line 31:

Now reads: "sensor memory'S being"

Should read: -- sensory memory being --

Column 2, line 41:

Now reads: "e compromised"

Should read: -- be compromised --

Column 2, line 45:

Now reads: "in a apparatus"

Should read: -- in an apparatus --

Signed and Sealed this
Twenty-third Day of July, 2013

Teresa Stanek Rea
*Acting Director of the United States Patent and Trademark Office*